US006993614B2

(12) United States Patent
Le et al.

(10) Patent No.: US 6,993,614 B2
(45) Date of Patent: Jan. 31, 2006

(54) MANAGEMENT METHODS AND APPARATUS THAT ARE INDEPENDENT OF OPERATING SYSTEMS

(75) Inventors: Tuan A. Le, San Jose, CA (US); Christopher J. Rinaldo, San Jose, CA (US); Angshuman Mukherjee, Fremont, CA (US); Vinh N. Truong, San Jose, CA (US); Daniel Delfatti, Belmont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 256 days.

(21) Appl. No.: 10/648,528

(22) Filed: Aug. 26, 2003

(65) Prior Publication Data

US 2005/0060463 A1 Mar. 17, 2005

(51) Int. Cl.
*G06F 13/00* (2006.01)
*H05K 7/10* (2006.01)
*H01R 12/16* (2006.01)

(52) U.S. Cl. .................... 710/300; 710/301; 710/306; 361/683; 370/465

(58) Field of Classification Search ................ 710/100, 710/300, 306, 313, 301, 105; 709/252, 301; 361/683, 686, 724; 370/400, 465, 522, 408
See application file for complete search history.

(56) References Cited

U.S. PATENT DOCUMENTS

| | | | | |
|---|---|---|---|---|
| 6,501,660 | B1 * | 12/2002 | Ho et al. ..................... | 361/752 |
| 6,836,811 | B2 * | 12/2004 | Ho et al. ..................... | 710/301 |
| 6,882,651 | B1 * | 4/2005 | Wegner et al. .............. | 370/401 |
| 6,889,245 | B2 * | 5/2005 | Taylor et al. ................ | 709/203 |

OTHER PUBLICATIONS

"PCI bus in high speed I/O systems applications" by Chame, A. (abstract only) Publication Date: Mar. 21-28, 1998.*

* cited by examiner

Primary Examiner—Gopal C. Ray
(74) Attorney, Agent, or Firm—Meyertons Hood Kivlin Kowert & Goetzel, P.C.; B. Noël Kivlin

(57) ABSTRACT

The present invention relates to a management agent that can be ran on any operating system. More specifically, the management agent of the present invention is implemented with a set of application program interfaces (APIs) that allows the management agent to be independent of operating systems. The APIs makes the management agent portable across multiple operating systems. In an embodiment of the present invention, a Compact Peripheral Component Interconnect (CPCI) computer system includes a CPCI chassis, a circuit board located within the CPCI chassis, a first central processing unit (CPU) card coupled with the circuit board. The CPCI computer system also includes a second CPU card coupled with the circuit board, a first management agent located within the first CPU card, and a second management agent located within the second CPU card. The first and second CPU cards each respectively has a first operating system and a second operating system.

20 Claims, 7 Drawing Sheets

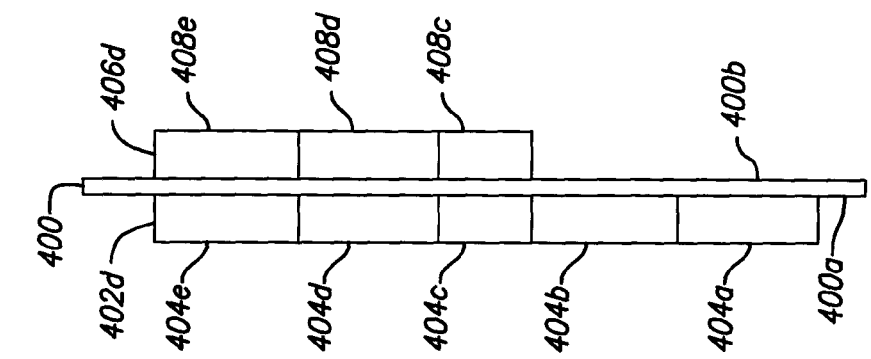
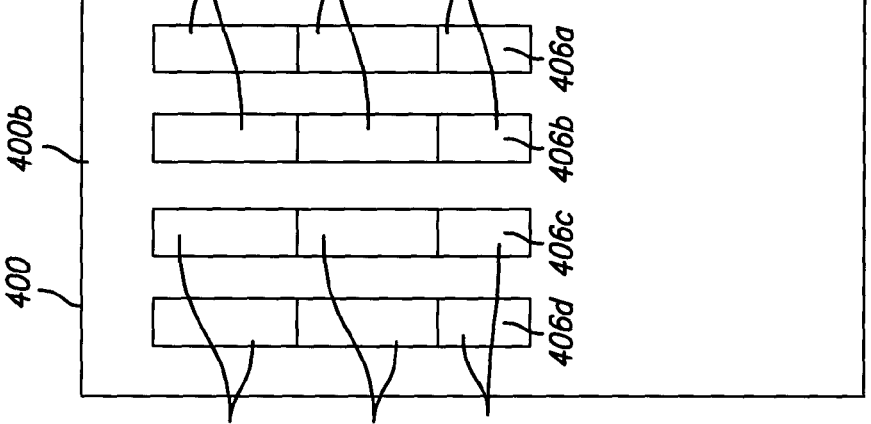
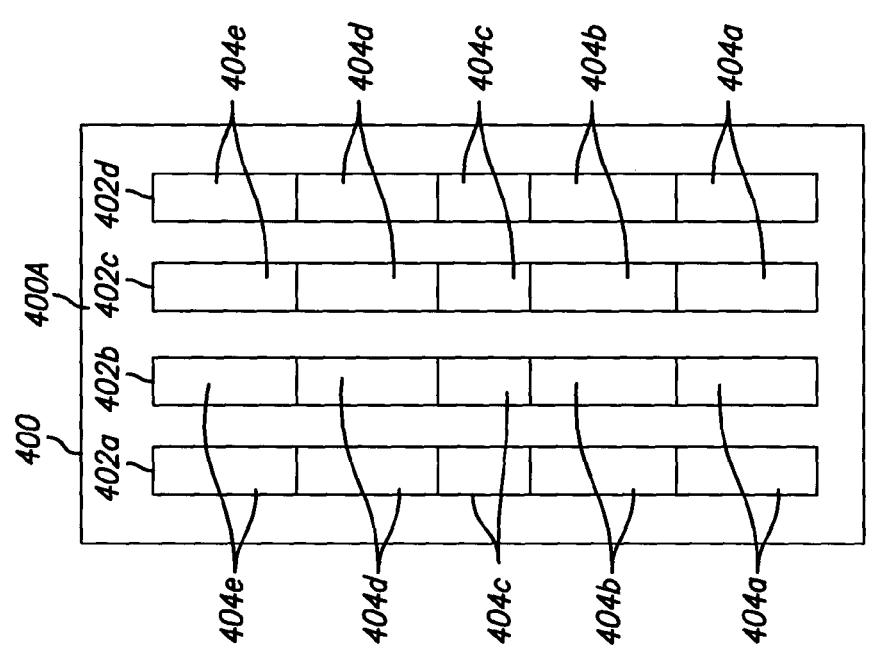

MANAGEMENT METHODS AND APPARATUS THAT ARE INDEPENDENT OF OPERATING SYSTEMS

BACKGROUND OF THE INVENTION

1. Field of the Invention

The present invention relates to computer systems and the like. More particularly, the present invention relates to apparatus and methods for managing computer systems in a network environment.

2. Description of Related Art

A computer platform can be designed with a variety of implementations/architectures that are either defined within existing standards, for example the PCI Industrial Computer Manufactures Group (PICMG) standards, or can be customized architectures. For example, a computer platform can be designed with a Compact Peripheral Component Interconnect (CPCI). The CPCI is a high performance industrial bus based on the standard PCI electrical specification in rugged 3U or 6U Eurocard packaging. CPCI is intended for application in telecommunications, computer telephony, real-time machine control, industrial automation, real-time data acquisition, instrumentation, military systems or any other application requiring high-speed computing, modular and robust packaging design, and long-term manufacturer support. Because of its high speed and bandwidth, the CPCI bus is particularly well suited for many high-speed data communication applications, such as for server applications.

Compared to a standard desktop PCI, CPCI supports twice as many PCI slots (typically 8 versus 4) and offers an ideal packaging scheme for industrial applications. Conventional CPCI cards are designed for front loading and removal from a card cage. The cards are firmly held in position by their connector, card guides on both sides, and a faceplate that solidly screws into the card cage. Cards are mounted vertically allowing for natural or forced air convection for cooling. Also, the pin-and-socket connector of the CPCI card is significantly more reliable and has better shock and vibration characteristics than the card edge connector of the standard PCI cards.

Conventional CPCI defines a backplane environment that is limited to eight slots. More specifically, the bus segment of the conventional CPCI system is limited to eight slots, which includes a system slot and peripheral slots. A host central processing unit (CPU) card (or front card or a system card or a motherboard) occupies the system slot and provides the clocking, arbitration, configuration, and interrupt processing for up to seven peripheral slots. The peripheral slots can be populated with input/output (I/O) cards or satellite CPU cards.

Each of these cards can be designed with a telecommunications network and may be considered as a network element of the telecommunications network. Over the last decade the telecommunications network has been in transition. In the past, network elements in the network were primarily designed for switched-voice traffic and were relatively simple. It was based on copper loops for subscriber access and a network of telephone exchanges to process calls. These network elements are evolving into one designed for integrated access, transport, and switching of voice, high-speed data, and video. The network elements in future telecommunications networks will be based on a variety of complex technologies. As a result of its complexity, each network element of the future should be accompanied by a management agent (or an element management system) that harnesses the power of the network element while masking its complexity. The management agent should also manage each of the network elements in a distributed manner. That is, each management agent manages resources on its network element and collaborates with another designated management agent (or a master agent) running on another designated network element for system-wide resources management. The operating system running on each of the network elements (or cards or CPUs) can be Solaris, ChorusOS, VxWork, Linux, etc. The management agent depends on the operating system running on the network element. However, the various operating systems that can be ran with the network elements may not be compatible with each other. Accordingly, there is a need to provide a management agent that can be ran with and/or is portable across various different operating systems. Thus, It would be advantageous to develop a management agent that is an operating system independent and/or to develop an interface system capable of porting a management agent across the various different operating systems.

SUMMARY OF THE INVENTION

The present invention relates to a management agent for a Compact Peripheral Component Interconnect (CPCI) computer system that can be ran on any operating system. Thus each management agent for managing resources of a network element (e.g., a CPCI front card) may be designed independently without being apprised of the operating system running on the network element. More specifically, the management agent of the present invention is implemented with a set of application program interfaces (APIs) that allow the management agent to be independent of operating systems. The APIs make the management agent portable across multiple operating systems.

In an embodiment of the present invention, a CPCI computer system includes a CPCI chassis, a circuit board located within the CPCI chassis, and a first central processing unit (CPU) card coupled with the circuit board. The CPCI computer system also includes a second CPU card coupled with the circuit board and a management agent located within said first CPU card. The first and second CPU cards each, respectively, has a first operating system and a second operating system. The management agent provides a management service to the first and second CPU card. The management agent is coupled to the first and second CPU cards via a management interface. The management agent is also ran with the first and second operating systems via the management interface. The CPCI computer system may also include a network interface coupled with the management agent for allowing the management agent to interface with the first and second operating systems via the management interface.

In yet another embodiment of the invention, a CPCI computer system includes a CPCI chassis, a circuit board located within the CPCI chassis, and a first central processing unit (CPU) card coupled with the circuit board. The CPCI computer system also includes a second CPU card coupled with the circuit board, a first management agent located within said first CPU card, and a second management agent located within said second CPU card. The first and second CPU cards each, respectively, has a first operating system and a second operating system. The first management agent locally provides a first management service for the first CPU card and systemically (or globally) provides a second management service for the first and second CPU cards. The second management agent locally provides a third management service for the second CPU card. In addition, the CPCI computer system further includes a management interface coupled with the first and second CPU cards and a network interface coupled with the management agent for allowing the first and second management agents to interface with the first and second operating systems via the management interface. The first management agent systemically provides the second management service for the first and second CPU cards with the first and second operating systems via the management interface.

A more complete understanding of the present invention will be afforded to those skilled in the art, as well as a realization of additional advantages and objects thereof, by a consideration of the following detailed description of the embodiment. Reference will be made to the appended sheets of drawings, which will first be described briefly.

BRIEF DESCRIPTION OF THE DRAWINGS

The drawings illustrate the design and utility of preferred embodiments of the invention. The components in the drawings are not necessarily to scale, emphasis instead being placed upon illustrating the principles underlying the embodiment. Moreover, in the drawings like reference numerals designate corresponding parts throughout the different views.

FIG. 4(a) shows a front view of another CPCI backplane;

FIG. 4(b) shows a back view of the backplane of FIG. 4(a);

FIG. 5 shows a side view of the backplane of FIGS. 4(a) and 4(b);

DETAILED DESCRIPTION

Figure 1:
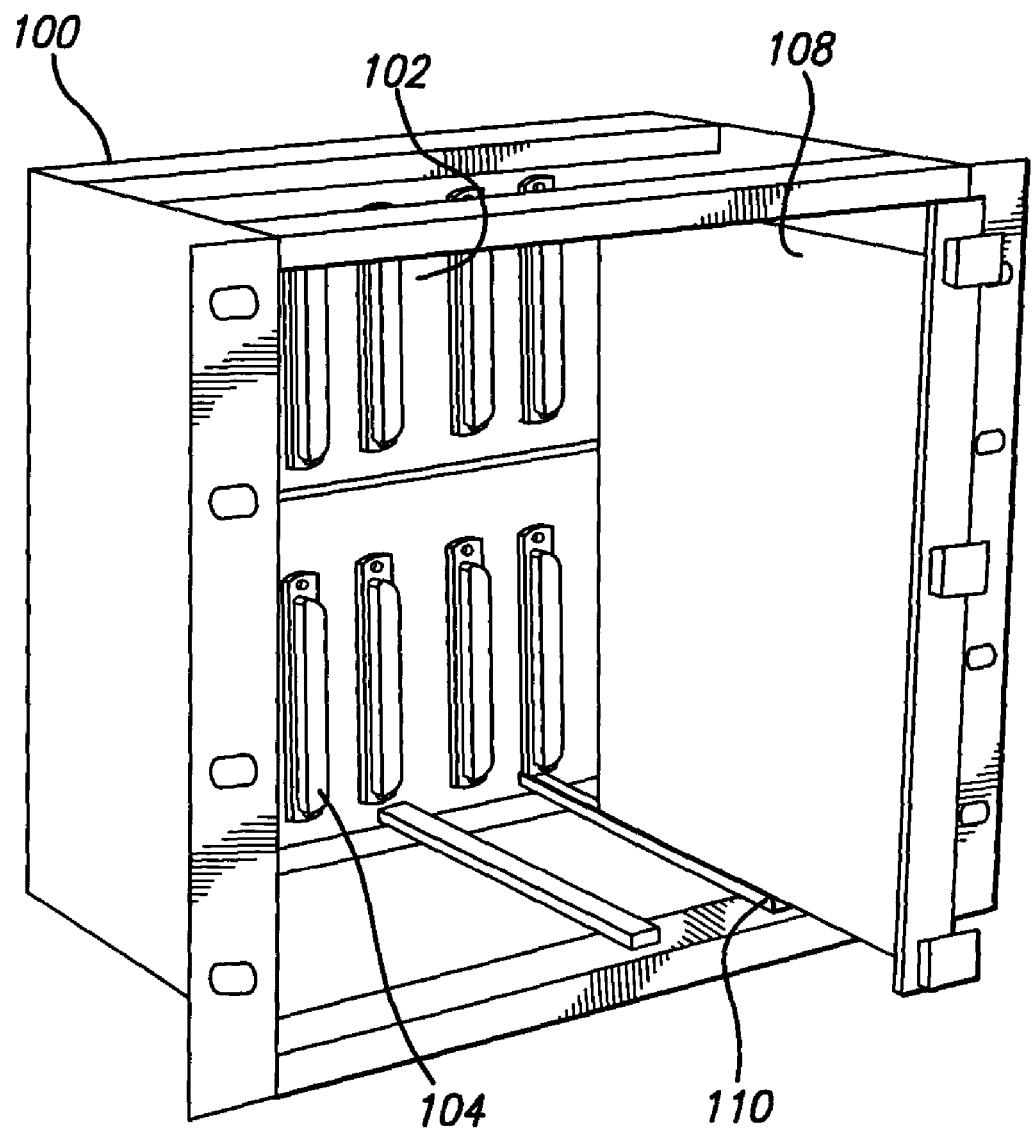
FIG. 1 is an exploded perspective view of a Compact Peripheral Component Interconnect (CPCI) chassis system according to an embodiment of the invention.

The present invention relates to a management agent for a CPCI system that can be ran across a plurality of operating systems. Thus, each management agent for managing resources of a network element may be designed independently without being apprised of the operating system running on the network element. More particularly, the present invention provides and implements a set of application program interfaces (APIs) and protocols that are independent of operating systems. The APIs and the protocols are to be used by a management agent for a CPCI system so that the management agent can be ran with any operating system. In the detailed description that follows, like reference numerals are used to describe like references shown in one or more of the drawings.

Embodiments of the present invention can be implemented with a computer platform that is designed with a Compact Peripheral Component Interconnect (CPCI).

Referring to FIG. 1, there is shown a perspective view of a CPCI chassis system. The chassis system 100 includes a CPCI circuit board referred to in the conventional CPCI system as a passive backplane 102 since the circuit board is located at the back of the chassis 100 and add-on cards (front cards) can only be inserted from the front of the chassis 100. On the front side of the backplane 102 are slots provided with connectors 104. In the CPCI chassis system 100 that is shown, a 6U daughter card 108 is inserted into one of the slots and mates with a corresponding one of the connectors 104. For proper insertion of the daughter cards 108 into the slots, card guides 110 are provided. This conventional chassis system 100 provides front removable daughter cards and unobstructed cooling across the entire set of daughter cards 108.

Figure 2:
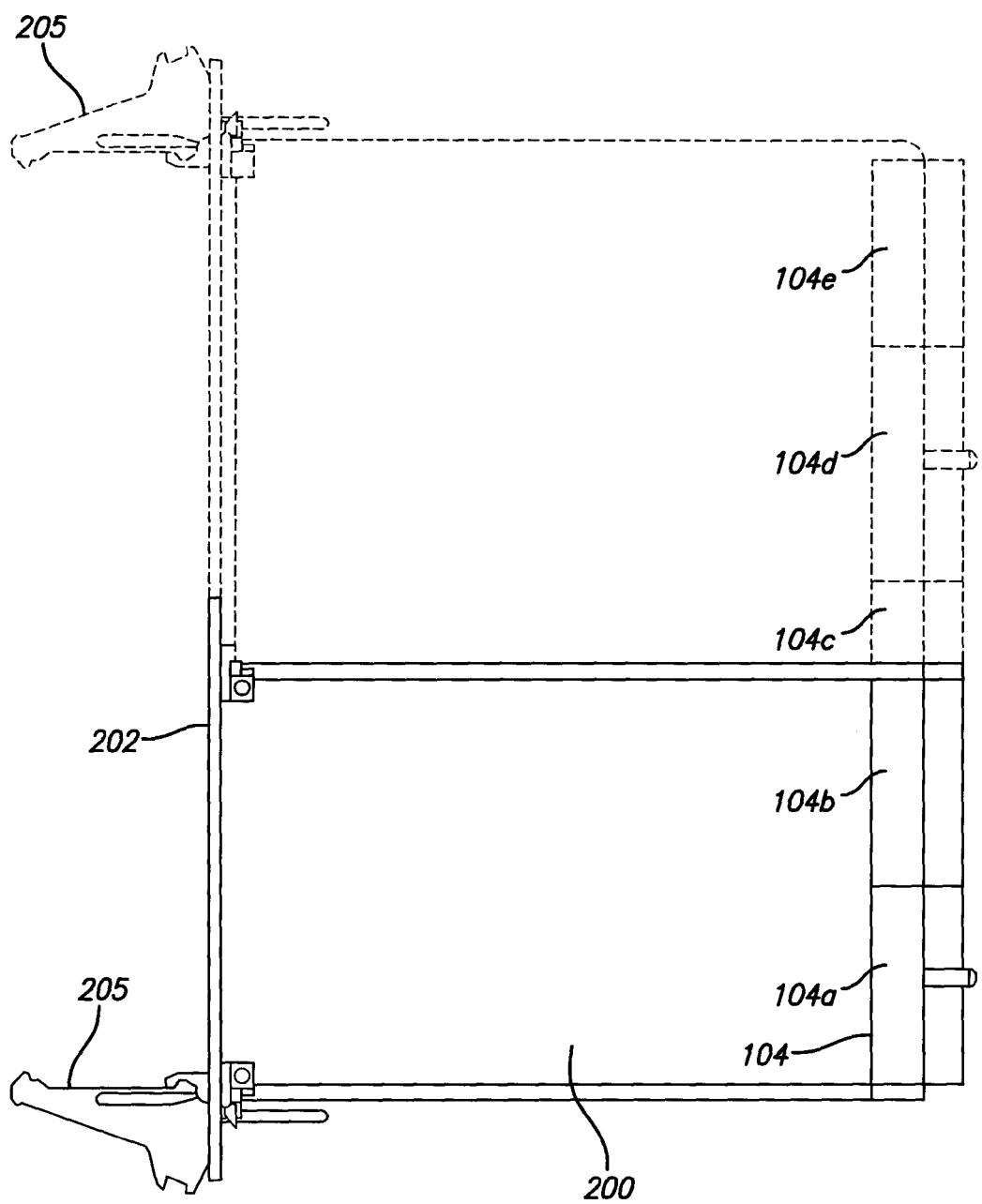
FIG. 2 shows the form factors that are defined for the CPCI node card.

Referring to FIG. 2, there are shown the form factors defined for the CPCI front card (e.g., motherboard), which is based on the PICMG CPCI industry standard (e.g., the standard in the PICMG 2.0 CPCI specification). As shown in FIG. 2, the front card 200 has a front plate interface 202 and ejector/injector handles 205. The front plate interface 202 is consistent with PICMG CPCI packaging and is compliant with IEEE 1101.1 or IEEE 1101.10. The ejector/injector handles should also be compliant with IEEE 1101.1. One ejector/injector handle 204 is used for 3U daughter cards, and two ejector/injector handles 204 are used for 6U daughter cards. The connectors 104a–104e of the daughter card 200 are numbered starting from the bottom connector 104a, and both 3U and 6U daughter card sizes are defined, as described below.

The dimensions of the 3U form factor are approximately 160.00 mm by approximately 100.00 mm, and the dimensions of the 6U form factor are approximately 160.00 mm by approximately 233.35 mm. The 3U form factor includes two 2 mm connectors 104a–104b and is the minimum as it accommodates the full 64 bit CPCI bus. Specifically, the 104a connectors are reserved to carry the signals required to support the 32-bit PCI bus; hence no other signals may be carried in any of the pins of this connector. Optionally, the 104a connectors may have a reserved key area that can be provided with a connector "key," which may be a pluggable piece (e.g., a pluggable plastic piece) that comes in different shapes and sizes, to restrict the add-on card to mate with an appropriately keyed slot. The 104b connectors are defined to facilitate 64-bit transfers or for rear panel I/O in the 3U form factor. The 104c–104e connectors are available for 6U systems as also shown in FIG. 2. The 6U form factor includes the two connectors 104a–104b of the 3U form factor, and three additional 2 mm connectors 104c–104e. In other words, the 3U form factor includes connectors 104a–104b, and the 6U form factor includes connectors 104a–104e. The three additional connectors 104c–104e of the 6U form factor can be used for secondary buses (i.e., Signal Computing System Architecture (SCSA) or MultiVendor Integration Protocol (MVIP) telephony buses), bridges to other buses (i.e., Virtual Machine Environment (VME) or Small Computer System Interface (SCSI)), or for user specific applications. Note that the CPCI specification defines the locations for all of the connectors 104a–104e, but only the signal-pin assignments for certain connectors are defined (e.g., the CPCI bus portion 104a and 104b are defined). The remaining connectors are the subjects of additional specification efforts or can be user defined for specific applications, as described above.

Figure 3:
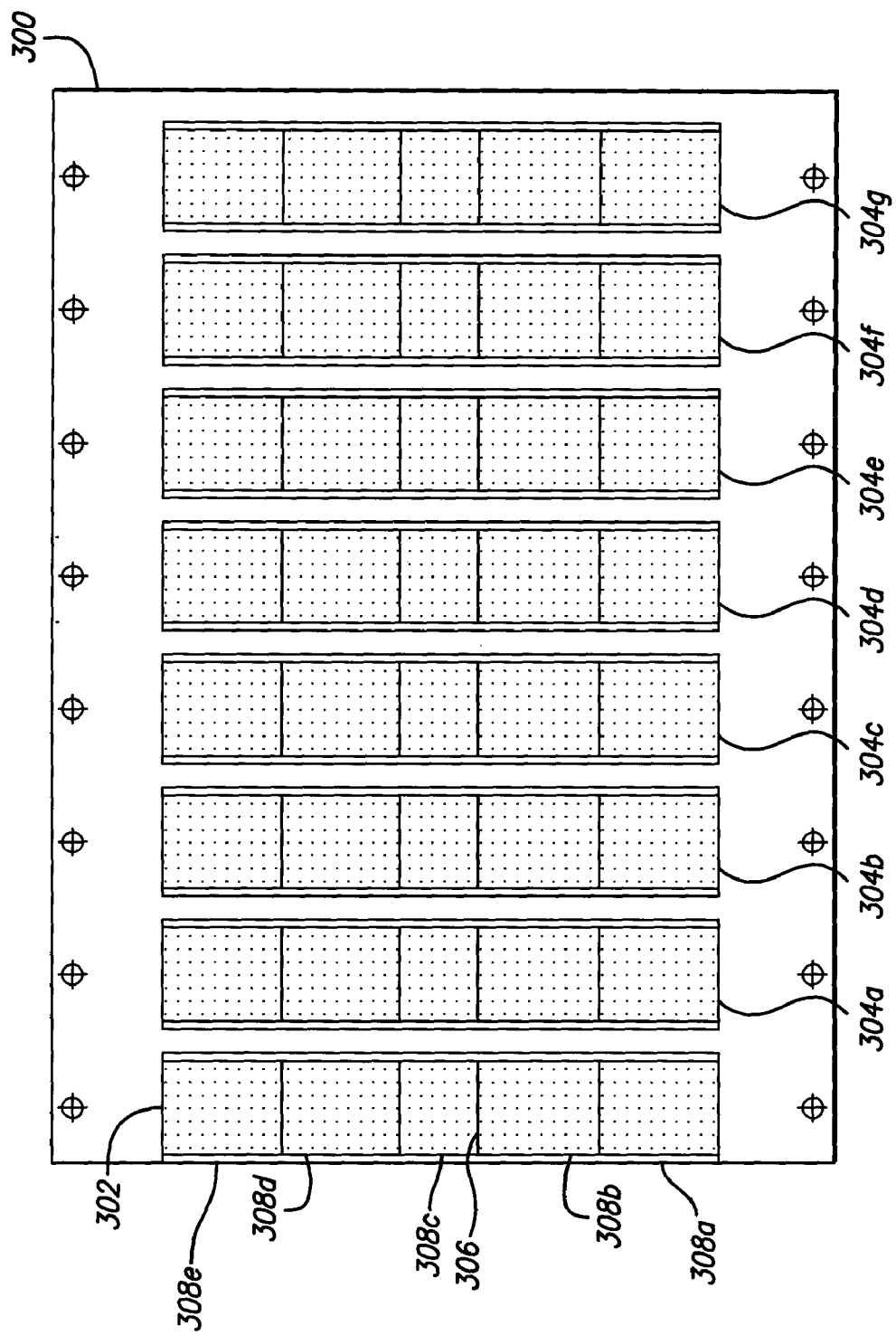
FIG. 3 is a front view of a backplane having eight slots with five connectors each.

Referring to FIG. 3, there is shown a front view of a 6U backplane having eight slots. A CPCI system includes one or more CPCI bus segments, where each bus segment typically includes up to eight CPCI card slots. Each CPCI bus segment includes at least one system slot 302 and up to seven peripheral slots 304a–304g. The CPCI front card for the system slot 302 provides arbitration, clock distribution, and reset functions for the CPCI peripheral cards on the bus segment. The peripheral slots 304a–304g may contain simple cards, intelligent slaves and/or PCI bus masters.

The connectors 308a–308e have connector-pins 306 that project in a direction perpendicular to the backplane 300, and are designed to mate with the front side "active" cards ("front cards"), and "pass-through" its relevant interconnect signals to mate with the rear side "passive" input/output (I/O) card(s) ("rear transition cards"). In other words, in the conventional CPCI system, the connector-pins 306 allow the interconnected signals to pass-through from the front cards, such as the motherboards, to the rear transition cards.

Referring to FIGS. 4(a) and 4(b), there are shown respectively a front and back view of a CPCI backplane in another 6U form factor embodiment. In FIG. 4(a), four slots 402a–402d are provided on the front side 400a of the backplane 400. In FIG. 4(b), four slots 406a–406d are provided on the back side 400b of the backplane 400. Note that in both FIGS. 4(a) and 4(b) four slots are shown instead of eight slots as in FIG. 3. Further, it is important to note that each of the slots 402a–402d on the front side 400a has five connectors 404a–404e while each of the slots 406a–406d on the back side 400b has three connectors 408c–408e. This is because the 404a connectors are provided for 32 bit PCI and connector keying and the 404b connectors are typically only for I/O in the 3U form factor. Thus, in the 6U form factor they do not typically have I/O connectors to their rear. Accordingly, the front cards that are inserted in the front side slots 402a–402d only transmit signals to the rear transition cards that are inserted in the back side slots 406a–406d through front side connectors 404c–404e.

Referring to FIG. 5, there is shown a side view of the backplane of FIGS. 4(a) and 4(b). As shown in FIG. 5, slot 402d on the front side 400a and slot 406d on the back side 400b are arranged to be substantially aligned so as to be back to back. Further, slot 402c on the front side 400a and slot 406c on the backside 400b are arranged to be substantially aligned, and so on. Accordingly, the front side connectors 404c–404e are arranged back-to-back with the back side connectors 408c–408e Note that the front side connector 404a–404b does not have a corresponding back side connector. It is important to note that the system slot 402a is adapted to receive the front card having a central processing unit (CPU); the signals from the system slot 402a are then transmitted to corresponding connector-pins of the peripheral slots 402b–402d. Thus, the preferred CPCI system can have expanded I/O functionality by adding peripheral front cards in the peripheral slots 402b–402d.

As envisioned in an embodiment of the present invention, a plurality of front cards similar to the ones described above are implemented with a telecommunications network. Each of the front cards may be considered as a network element (NE) of the telecommunications network. The network elements (or NEes) in the telecommunications network are designed for integrated access, transport, and switching of voice, high-speed data, and video. The NEes are based on a variety of complex technologies. As a result of its complexity, each of these NEes is accompanied by a management agent (or an element management system) that harnesses the power of the NE while masking its complexity.

Figure 6:
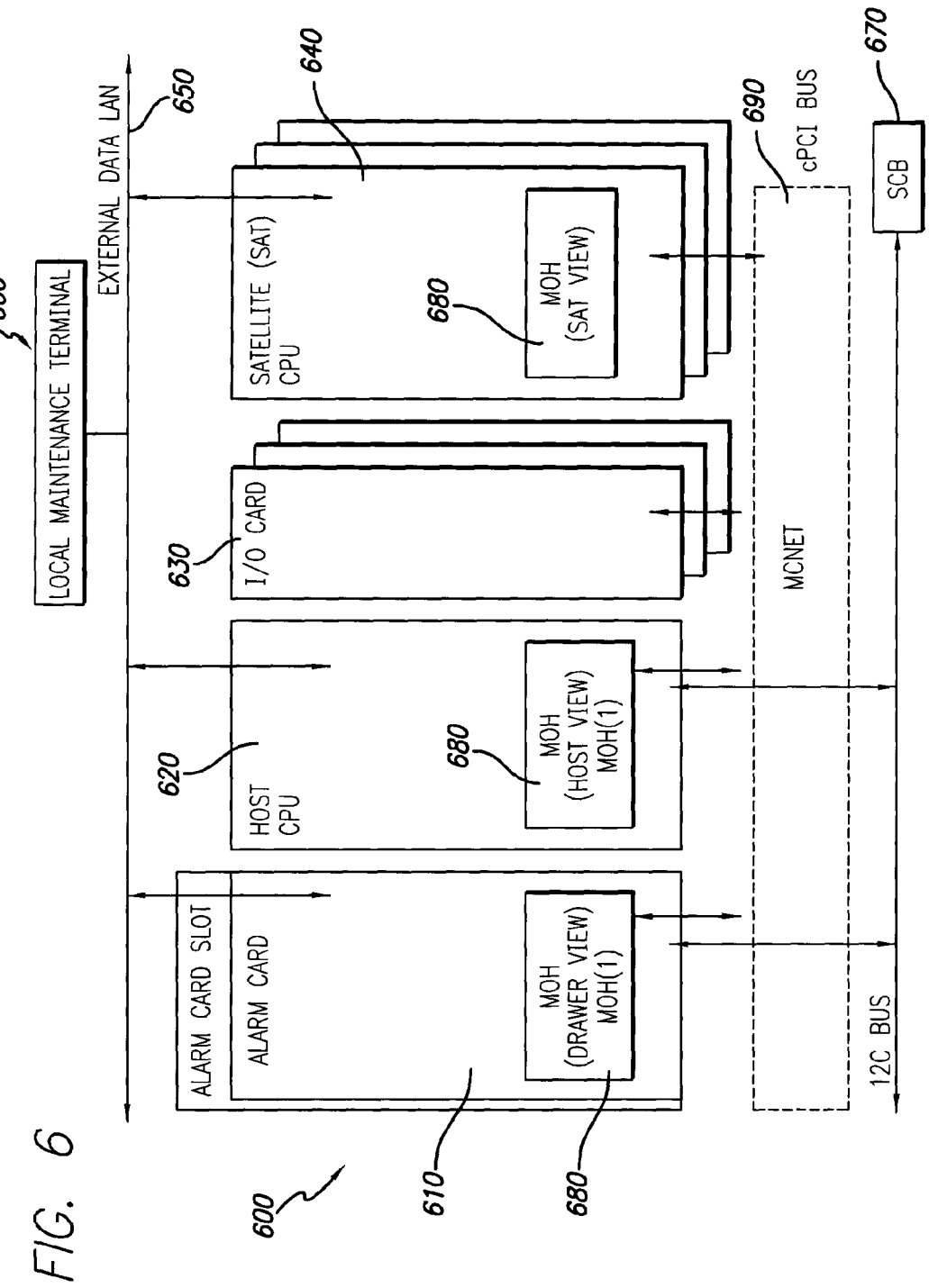
FIG. 6 shows a block diagram that illustrates a CPCI system having various management agents.

Referring to FIG. 6, a CPCI system 600 (or drawer) may include a plurality of front cards (or NEes). The front cards comprise an alarm card 610, a host card 620 (or system card or CPU card), one or more input/output (I/O) cards 630, and one or more satellite cards 640 (or intelligent slaves or satellite CPU card). All CPU cards are connected to an external local area network (LAN) 650 where a local maintenance terminal (LMT) 660 can be connected. From the LMT 660, a user can connect to any of the CPU cards for maintenances purposes. The system controller board (SCB) 670 provides hot swap and system signals for both the alarm card 610 and the host card 620. There is a management agent (or element management system or managed object hierarchy or MOH) 680 running on each of the CPU cards (i.e., alarm, host, satellites) in a distributed matter. The management agent 680 on each CPU card communicates with each other via a distributed managed object (MO) network (Net) 690 which is implemented over the CPCI backplane (not shown). In this embodiment, the MOH (or management agent) 680 running on the alarm card 610 manages its own local on-board devices, in addition to the drawer resources such as fans, power supplies, etc. The MOH 680 running on the host card 620 manages its own local on-board devices, in addition to, the MONet 690 (or CPCI bus), CPCI I/O cards 630, and satellite cards 640. The activities provided by the MOH 680 on the host card 620 include enumeration of the bus, handling CPCI hot swaps, configuration of drivers for I/O cards, etc. The MOH 680 on the satellite card 640 manages its own on-board local devices and devices that are plugged into its expansion slot. Thus, the MOH 680 on the alarm card 610 or the host card 620 card may provide a drawer level (or host level) management view of the CPCI system 600.

In one embodiment of the present invention, a CPCI system may have either eight CPCI slots or five CPCI slots. The CPCI system (or drawer) may also have an alarm card and a host CPU card. The alarm card occupies a first CPCI slot of the CPCI system (e.g., slot 8 in the eight CPCI slots embodiment and slot 1 in the five CPCI slots embodiment) and the host CPU card occupies a second CPCI slot of the CPCI system (e.g., slot 1 in the eight slots embodiment and slot 3 in the five slots embodiment). The rest of the CPCI slots of the CPCI system can be populated with I/O cards or satellite CPU cards. For example, the eight CPCI slots embodiment may have one alarm card, one host CPU card, and six satellite CPU cards. For each of the CPU cards, there is a local management agent (or a local MOH) running on it. The local MOH provides local management for the resources and devices on its local CPU card. The local MOH also collaborates its resources with another MOH (or master agent) to provide the view of the whole drawer (or the whole CPCI system). The MOH (or master agent) that provides the drawer level view may be running on the alarm card. Thus, the local management agent interfaces with the master agent to allow for the management of the whole CPCI system.

Figure 7:
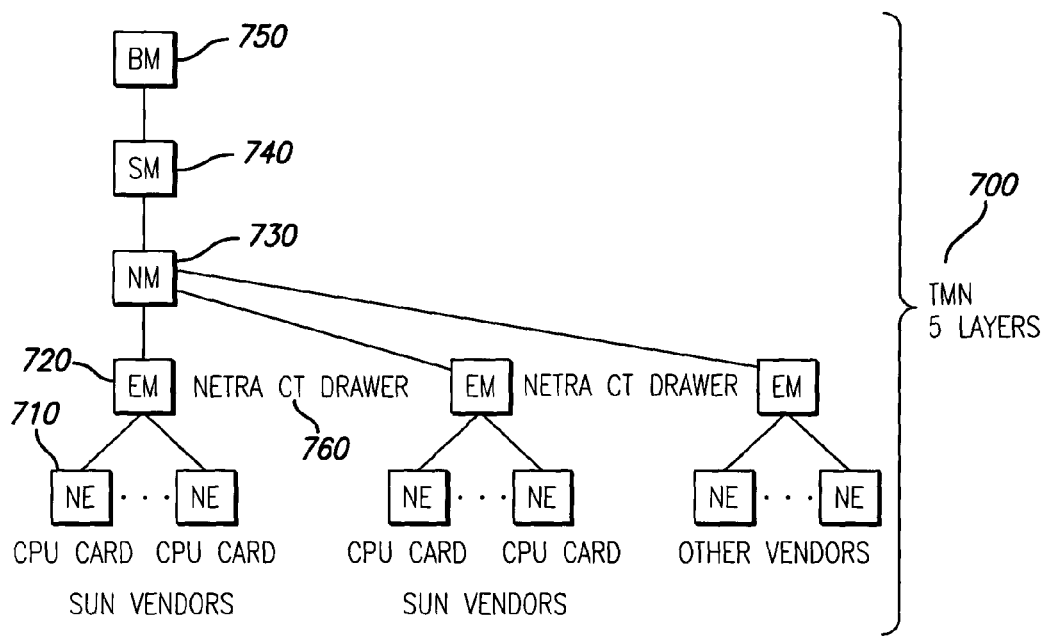
FIG. 7 shows a block diagram that illustrates a CPCI system having various management hierarchy layers.

Referring to FIG. 7, embodiments of the present inventions can be managed based on the Telecommunication Management Network (TMN) standard. In the TMN context, a CPCI system 760 (or drawer) comprises management interfaces for network elementes (NEes) 710 and management interfaces for element managements (EMs) 720. A management agent (or MOH) that runs on each CPU card (i.e., host, satellite or alarm card—each of which can be considered as an NE 710 in the CPCI system 760) provides the NE management interface for local devices or resources as seen by the card. The management agent (or MOH or management software) running on either the host or the alarm card, in addition, provides a drawer (EM) level management interface which covers drawer level resources such as chassis, fan, power supply, I/O cards management and satellite CPU cards management. The management software or agent on the CPCI system may provide the management interface to the upper managements layers of the TMN model 700 (e.g., The TMN model 700 has five layers comprising NE 710, EM 720, network management (NM) 730, service management (SM) 740, and business management (BM) 750 layers). Typically, the drawer system 760 comprises many NEes 710 from many different vendors, each requiring its own management agent (i.e., its own NE management software and EM software depending on the operating systems running the NEes 710 or EMs 720). As an example of the TMN model 700, an enterprise may use a plurality of CPCI drawers 760 as NEes/EMs interfaces and run their own upper management manager layers (e.g., NM 730, SM 740, and BM 750) on top of the EM layer 720 and/or the NE layer 710 as shown in FIG. 7.

As previously mentioned, the operating system running on each NE (or cards or CPUs) can be Solaris, ChorusOS, VxWork, Linux, etc. In one embodiment of the present invention, a method and system is developed to make the management agent on each of the NEes portable across these various operating systems. More specifically, the management agent of the present invention is implemented with a set of management interfaces, such as a set of application program interfaces (APIs). The APIs are to be used by the management agent so that the management agent can be ran on a NE without being apprised of the operating system running on the NE.

Figure 8:
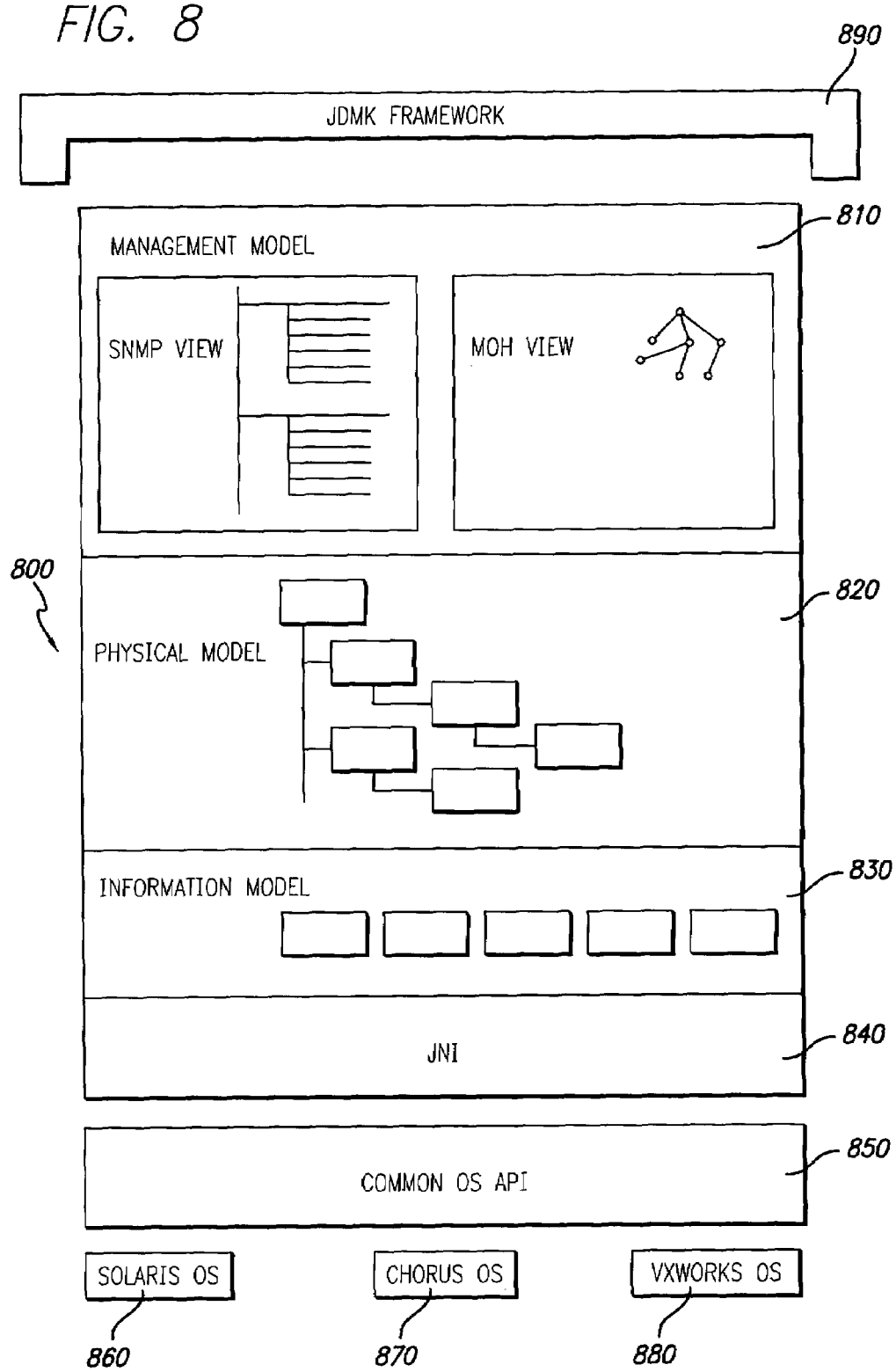
FIG. 8 shows a management agent framework according to one embodiment of the present invention.

Referring to FIG. 8, a management software 800 of the present invention may be implemented in Java as an agent application which runs under Java Development Management Kit (JDMK) framework 890. The MOH 800 of the present invention is designed to run on various operating systems (e.g., Solaris 860, VxWorks 880, Chorus 870, etc.). The MOH 800 comprises a management model 810, a physical model 820, an information model 830, and a network interface, such as a Java Native Interface (JNI 840).

The management model (or view) 810 provides the interfaces to the MOH (or the management application, agent, or software) 800 via standard protocols such as Simple Network Management Protocol (SNMP), Remote Method Invocation (RMI), etc. For example in one embodiment, the management software (or agent) 800 is implemented with the SNMP. For the SNMP implementation of the management agent 800, information will be stored in the SNMP Managed Information Base (MIB) objects/tables and presented via standard SNMP operations. In another embodiment the management software (or agent) 800 is implemented with a proprietary protocol. For the proprietary implementation (or MOH implementation) of the management agent 800, the information will be stored in a proprietary way, and presented via a private/Java/RMI interface.

The physical model 820 models the physical entities that constitute the system being managed by the MOH 800. The physical model provides a hierarchy of objects representing physical entities without exposing the specific details of the objects. For example, this layer 820 models the CPCI slot, the fan tray slot as equipment holders, and the CPCI card and fan as plug-ins. The physical model 820 aggregates platform information in a general view and provides information such as slot status, operation status, etc.

The information model 830 comprises platform specific information which supports the physical model 820. The information model 830 provides information such as fan type, power supply type, I/O card type, Ethernet port, etc.

The JNI 840 allows the MOH 800 (comprising the management model 810, physical model 820, and information model 830) to interface with the underlying OSes via a Common Operating System Layer (COSL) 840. The COSL 840 provides a set of APIs which are implemented on each of the supported OSes such as Solaris 860, Chorus 870, VxWorks 880 to facilitate the portability of the MOH 800 across these OSes (e.g., 860, 870, and/or 880).

Figure 9:
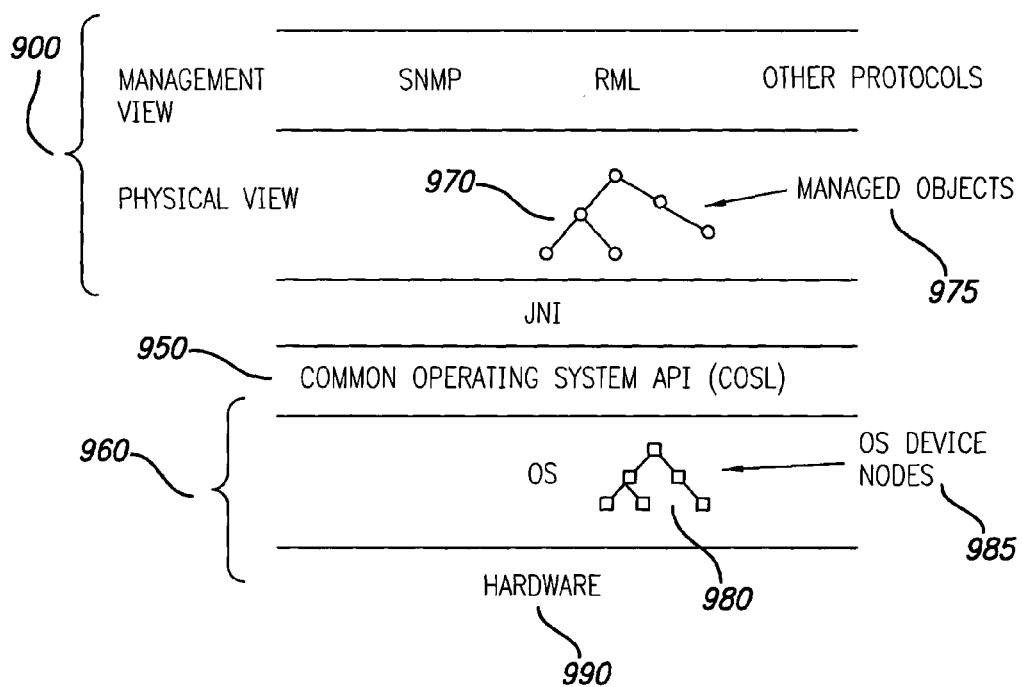
FIG. 9 shows an interrelationship between a management agent, an application program interface, and an operating system according to one embodiment of the present invention.

FIG. 9 illustrates a relationship between MOH 900 and COSL 950 in accordance with an embodiment of the present invention. The relationship is based on a CPCI equipment model 990, OS device node tree 980, and MOS managed objects 975. The MOH managed objects 975 span both the physical model and information model (e.g., 820 and 830 in FIG. 8). Each managed object 975 contains a generic part of the physical model (e.g., CPCI slot is a equipment holder, Ethernet port is a termination path, etc.) and a device specific part from the information model (e.g., fan type, power supply type, power supply vendor, etc.)

Both the MOH 900 and the OS platform 960 are based on the same physical equipment model 990 which abstracts the supported CPCI equipment constituting the CPCI computer system associated with the MOH 900. The OS platform 960 discovers all its devices during the platform management initialization (i.e., chassis, CPCI slots, plug-ins, etc.) and builds the device node tree 980. The MOH 900, also during its own initialization, constructs its physical tree 970 which contains the MOS managed objects 975 using a set of API's 950 having a set of topology discovery API's. The managed objects 975 include chassis, equipment holder for (or of type) CPCI slot, equipment holder for (or of type) fan slot, etc. Each of the managed objects 975 contains attributes (e.g., name-value pair that allow for get/set operation), actions (e.g., methods that can be performed, e.g., reset, test, etc.), notifications (e.g., asynchronous events that are generated by objects), and relationships (e.g., association and containment hierarchy between objects).

To the MOH 900, each managed object 975 on the physical tree 970 represents a physical entity. In the MOH 900 point of view, there is information used only by management software 900 (i.e., administrative status locked, unlocked, etc.) and information that requires support from the OS platform 960 (e.g., operational status of a link up or down). Once the managed objects tree 970 is built, the MOH 970 interacts with the OS platform 960 via the managed object 975 (using the managed object properties to "get" and "set" management directions) to the associated OS device node 985. The MOH managed objects tree 970 is kept in synchronization with the platform OS devices (or device nodes) 985 via events. Each event is associated with a device node 985 to indicate the event source.

In accordance with another embodiment of the present invention and referring still to FIG. 9, the OS device node tree 980 is a requirement for the set of COSL APIs 950 to support the management software (or MOH) 900. Each of the OS device nodes 985 are predefined. The device nodes 985 represent physical devices (or hardware) in an OS independent way. For example, the power supply is represented as a plug-in. Attributes of the plug-in are predefined. The implementation of the COSL APIs 950 to populate the information as required by the device node 985 (i.e., power supply) is OS dependent. For example, an API 950 has to interface with a Solaris device driver, if the OS is Solaris, to pull the vendor, model, etc. information out of the power supply. Similarly, if the OS is VxWorks, an API 950 has to interface with a VxWorks device driver to pull the vendor, model, etc. information. Thus, in this embodiment of the present invention, the MOH 900 is implemented with the COSL APIs 950, and sets of device nodes 985 (based on TMN standards for TMN Equipments, Plug-ins, Termination Points, Holders, etc.) representing physical devices to allow the MOH 900 to run on any operating system. To put it another way, the MOH 900 can run on any operating system if that operating system implements the COSL APIs 950 and the sets of device nodes 985.

In one embodiment of the present invention, a plurality of APIs to be used with a management agent are constructed to allow the management agent to be independent of the operating system (OS). Thus, when the underlying platform (NE) is implemented with the APIs, the management agent can manage the NE without being apprised of the operating system running on the NE.

In general and according to the foregoing, an exemplary management agent (or MOH) of the present invention needs to discover the device topology (e.g., the OS device nodes tree in FIG. 9) of the OS platform it runs on and to receive events related to devices on this device topology (or tree). For example, the MOH of a CPCI system needs to know about the event of when a device node representing a CPCI card is created on the topology (or tree) at the time when the CPCI card is inserted into the CPCI system. Accordingly, referring again to FIG. 9, in an exemplary operation scenario (or a protocol) in accordance with the present invention, the MOH 900 calls on a first API or COSL API or Platform Independent Management (PIM or pim) API 950 to establish connection with the OS platform framework 960. In one embodiment, pim_create_tree( ) is the API 950 called by the MOH 900 to establish connection with the OS platform management framework 960. This call is blocked until the OS platform framework 960 is ready to communicate (after it already constructs its own device nodes tree 980). Then, the MOH 900 calls a second API 900 to begin discovery of the device nodes tree. In one embodiment, pim_get_root( ) is the second API 950 called by the MOH 900 so the MOH 900 can start to progress down the device nodes tree 980 for topology discovery. Each device of the system is represented as a device node 985 on the device nodes tree 980. The device node 985 is described in a 'class node' object 975. The 'class node' object 975 contains information related to parent object, child object, peer object, etc., as defined, for example, in the Common Operating System API Specification Appendix attached at the end of this description section. These information allow the MOH 900 to progress down the whole device nodes tree 980.

For each device node 985, the MOH 900 can query for the information in each node 985 via a third and further APIs 950. In one embodiment, the MOH 900 can query for the information in each node 985 via APIs 950: pim_get_prop_info( ), pim_get_first_prop( ), pim_get_next_prop( ), etc. The MOH 900 can also use other APIs 950 for registering/unregistering events. An event may comprise a node creating event (as a result of a card inserted into the system), a node deleting event (as a result of a card removed from the system), a node updating event (as a result of a change in node property), or an error event (e.g., as a result of a communication channel failure between the MOH 900 and the OS platform 960). In one embodiment, the MOH 900 uses pim_add_tree_listener ( ) and pim_remove_tree_listener ( ) for registering/unregistering of the events.

In one embodiment of the present invention, a set of APIs to be used with a management agent is created and defined as follows. One function of these APIs is to allow the management agent to run (or to be ported) across various OSes. In addition, the following APIs are provided as examples of the present invention by which the invention is not limited.

pim_prop info_t pinfo;
    void *propval;
} pim_updated_prop_t;
and pim_timestamp_t is declared as follows—
    typedef unsigned long long pim_timestamp_t;
pim_remove_tree_listener( ) is the function used by the MOH to un-register for tree events.
Return Values
PIM_OK Successful completion
PIM_INVALID_TREEHDL Invalid tree handle specified
PIM_FAILURE PIM service failed
PIM_NOT_IMPLEMENTED Unimplemented function by the platform

Having thus described embodiments of the present invention, it should be apparent to those skilled in the art that certain advantages of the described system have been achieved. It should also be appreciated that various modifications, adaptations, and alternative embodiments thereof may be made within the scope and spirit of the present invention. For example, a system comprising CPCI system has been illustrated, but it should be apparent that the inventive concepts described above would be equally applicable to other types of card arrangements, buses, motherboards, and computer systems. The invention is further defined by the following Appendix.

What is claimed is:

1. A Compact Peripheral Component Interconnect (CPCI) computer system, comprising:
    a CPCI chassis;
    a circuit board located within said CPCI chassis;
    a first central processing unit (CPU) card coupled with said circuit board, said first CPU card having a first operating system;
    a second CPU card coupled with said circuit board, said second CPU card having a second operating system;
    a management agent located within said first CPU card, said management agent providing a management service; and
    a management interface coupled with said management agent and said first and second CPU cards;
    wherein said management agent provides said management service to said first and second CPU cards; and
    wherein said management agent can be ran with said first and second operating systems via said management interface.

2. The CPCI computer system of claim 1, further comprising a set of device nodes implemented with said management agent, said set of device nodes representing said first and second CPU cards.

3. The CPCI computer system of claim 2, wherein said management agent comprises a managed object tree having a plurality of managed objects associated with said set of device nodes.

4. The CPCI computer system of claim 3, wherein said set of device nodes are organized by using a device node tree.

5. The CPCI computer system of claim 4, wherein said management interface comprises a plurality of events and wherein said managed object tree is kept in synchronization with said device node tree via said plurality of events.

6. The CPCI computer system of claim 1, wherein said management interface comprises a first operating system (OS) independent application program interface (API) for allowing said management agent to establish a connection with said second CPU card.

7. The CPCI computer system of claim 6, wherein said management interface comprises a second OS independent API for allowing said management agent to discover resources on said second CPU card.

8. The CPCI computer system of claim 7, wherein said management interface comprises a third OS independent API for allowing said management agent to query for information from said second CPU card.

9. The CPCI computer system of claim 1, further comprising a network interface coupled with said management agent for allowing said management agent to interface with said management interface.

10. The CPCI computer system of claim 9, wherein said network interface comprises a Java Native Interface.

11. The CPCI computer system of claim 9, wherein said management agent can be ran with said first and second operating systems via said management interface and wherein said management agent needs to be ran with said first and second operating systems to provide said management service.

12. The CPCI computer system of claim 9, wherein said management agent comprises a management model for providing a management protocol, a physical model for representing physical entities being managed, and an information model for providing platform specific information for said physical model.

13. The CPCI computer system of claim 12, wherein said management model comprises one of a Simple Management Protocol, a Remove Method Invocation protocol, and a proprietary protocol.

14. The CPCI computer system of claim 9, wherein said management interface comprises a Common Operating System (Common OS) Application Program Interface (API).

15. The CPCI computer system of claim 14, wherein said network interface comprises a Java Native Interface.

16. The CPCI computer system of claim 1, wherein said management interface comprises a Common Operating System (Common OS) Application Program Interface (API).

17. A Compact Peripheral Component Interconnect (CPCI) computer system, comprising:
  a CPCI chassis;
  a circuit board located within said CPCI chassis;
  a first central processing unit (CPU) card coupled with said circuit board, said first CPU card having a first operating system;
  a second CPU card coupled with said circuit board, said second CPU card having a second operating system;
  a management agent located within said first CPU card, said management agent providing a management service;
  a management interface coupled with said first and second CPU cards; and
  a network interface coupled with said management agent for allowing said management agent to interface with said first and second operating systems via said management interface;
  wherein said management agent provides said management service to said first and second CPU cards.

18. A Compact Peripheral Component Interconnect (CPCI) computer system, comprising:
  a CPCI chassis;
  a circuit board located within said CPCI chassis;
  a first central processing unit (CPU) card coupled with said circuit board, said first CPU card having a first operating system;
  a second CPU card coupled with said circuit board, said second CPU card having a second operating system;
  a first management agent located within said first CPU card, said first management agent providing a first local management service for said first CPU card and a global management service for said first and second CPU cards;
  a second management agent located within said second CPU card, said second management agent providing a second local management service for said second CPU card;
  a management interface coupled with said first and second CPU cards; and
  a network interface coupled with said management agent for allowing said first and second management agents to interface with said first and second operating systems via said management interface;
  wherein said first management agent provides said global management service with said first and second operating systems via said management interface.

19. The CPCI computer system of claim 18, wherein said second management agent provides a management information about said second CPU card to said first management agent via said management interface.

20. The CPCI computer system of claim 19, wherein said first management agent uses said management information about said second CPU to provide said global management service for said first and second CPU cards.

* * * * *